US010063107B2

(12) United States Patent
Makwinski et al.

(10) Patent No.: US 10,063,107 B2
(45) Date of Patent: Aug. 28, 2018

(54) PORTABLE WIRELESS POWER CHARGING SYSTEM FOR A TABLE WITH CHARGING DOCK

(71) Applicant: The Wiremold Company, West Hartford, CT (US)

(72) Inventors: Mark Makwinski, Cromwell, CT (US); Phillip D. Prestigomo, Simsbury, CT (US)

(73) Assignee: The Wiremold Company, West Hartford, CT (US)

( * ) Notice: Subject to any disclaimer, the term of this patent is extended or adjusted under 35 U.S.C. 154(b) by 32 days.

(21) Appl. No.: 14/847,399

(22) Filed: Sep. 8, 2015

(65) Prior Publication Data

US 2016/0072338 A1 Mar. 10, 2016

Related U.S. Application Data

(60) Provisional application No. 62/046,251, filed on Sep. 5, 2014.

(51) Int. Cl.
*H02J 7/00* (2006.01)
*H02J 50/23* (2016.01)
*H02J 7/02* (2016.01)

(52) U.S. Cl.
CPC ............ *H02J 50/23* (2016.02); *H02J 7/0042* (2013.01); *H02J 7/027* (2013.01); *H02J 2007/0062* (2013.01)

(58) Field of Classification Search
CPC .......... H02J 7/025; H02J 7/0054; H02J 50/10; H02J 50/12; H02J 50/50; H02J 17/00

USPC .......................... 320/103, 104, 108; 307/104
See application file for complete search history.

(56) References Cited

U.S. PATENT DOCUMENTS

| 7,211,986 B1 | 5/2007 | Flowerdew et al. |
| 8,618,695 B2 | 12/2013 | Azancot et al. |
| 8,766,484 B2 | 7/2014 | Baarman et al. |
| 9,438,070 B2 | 9/2016 | Byrne et al. |
| 9,484,751 B2 | 11/2016 | Byrne et al. |
| 2005/0017677 A1 | 1/2005 | Burton et al. |
| 2007/0103110 A1 | 5/2007 | Sagoo |
| 2007/0279002 A1 | 12/2007 | Partovi |

(Continued)

FOREIGN PATENT DOCUMENTS

| JP | 2012 165553 A | 8/2012 |
| JP | 2012165553 A * | 8/2012 |

(Continued)

OTHER PUBLICATIONS

Machine Translation of Hakasaka Japanese Publication JP2012165553A.*

(Continued)

*Primary Examiner* — David V Henze-Gongola
(74) *Attorney, Agent, or Firm* — McCormick, Paulding & Huber LLP

(57) ABSTRACT

A portable charger tray includes an internal rechargeable power supply and a first wireless power transmitter connected to the internal rechargeable power supply for wirelessly charging a portable electronic device. A wireless power charging system includes the portable charger tray for wirelessly charging the portable electronic device and a dock for charging the internal rechargeable power supply of the portable charger tray.

17 Claims, 12 Drawing Sheets

(56) References Cited

U.S. PATENT DOCUMENTS

| | | |
|---|---|---|
| 2008/0061733 A1 | 3/2008 | Toya |
| 2009/0096413 A1 | 4/2009 | Partovi et al. |
| 2009/0212638 A1 | 8/2009 | Johnson |
| 2009/0212737 A1* | 8/2009 | Johnson ................. A47B 96/02 320/108 |
| 2009/0243397 A1 | 10/2009 | Cook et al. |
| 2009/0278493 A1* | 11/2009 | Alden ................. H01R 13/6633 320/108 |
| 2009/0278505 A1 | 11/2009 | Toya et al. |
| 2010/0127660 A1* | 5/2010 | Cook ..................... H01Q 1/248 320/108 |
| 2010/0201312 A1* | 8/2010 | Kirby ..................... H02J 7/025 320/108 |
| 2011/0241603 A1 | 10/2011 | Chang et al. |
| 2011/0258251 A1 | 10/2011 | Antoci |
| 2012/0235636 A1 | 9/2012 | Partovi |
| 2013/0038280 A1 | 2/2013 | Boundy et al. |
| 2013/0049682 A1 | 2/2013 | Niec et al. |
| 2013/0106353 A1* | 5/2013 | Foster ................... H02J 7/0044 320/114 |
| 2013/0147429 A1 | 6/2013 | Kirby et al. |
| 2013/0154555 A1 | 6/2013 | Miller et al. |
| 2013/0157488 A1 | 6/2013 | Zhang et al. |
| 2013/0257363 A1 | 10/2013 | Lota et al. |
| 2013/0257368 A1 | 10/2013 | Lau et al. |
| 2013/0278207 A1 | 10/2013 | Yoo |
| 2013/0285601 A1 | 10/2013 | Sookprasong et al. |
| 2013/0314036 A1 | 11/2013 | Nakagawa |
| 2014/0035380 A1 | 2/2014 | Stevens et al. |
| 2014/0084863 A1 | 3/2014 | Nakamura et al. |
| 2014/0103732 A1 | 4/2014 | Irie et al. |
| 2014/0132201 A1 | 5/2014 | Tsang |
| 2014/0152248 A1 | 6/2014 | Yeh |
| 2014/0165607 A1 | 6/2014 | Alexander |
| 2014/0210405 A1* | 7/2014 | Yang ..................... H02J 7/0044 320/108 |
| 2014/0305927 A1 | 10/2014 | Alexander |
| 2015/0123483 A1* | 5/2015 | Leabman ................. H02J 5/005 307/104 |
| 2017/0025886 A1 | 1/2017 | Rohmer et al. |

FOREIGN PATENT DOCUMENTS

| | | |
|---|---|---|
| KR | 10 2006 0106632 | 10/2006 |
| KR | 10 2009 0098239 | 9/2009 |
| KR | 20130095124 A | 8/2013 |

OTHER PUBLICATIONS

International Search Report for International Patent Application No. PCT/US2015/057777 dated Mar. 7, 2016.

Search Report dated Dec. 21, 2015 of corresponding PCT Application No. PCT/US2015/048815.

Supplementary European Search Report for Serial No. EP 15 85 5598 dated Mar. 15, 2018.

* cited by examiner

PORTABLE WIRELESS POWER CHARGING SYSTEM FOR A TABLE WITH CHARGING DOCK

CROSS REFERENCE TO PRIOR APPLICATION

This application claims the benefit of U.S. Provisional Patent Application No. 62/046,251 filed Sep. 5, 2014, the content of which is incorporated herein by reference in its entirety.

TECHNICAL FIELD

The disclosure relates to wireless power charging technologies, and more particularly, to trays for wirelessly charging electronic devices.

BACKGROUND

Portable electronic devices require recharging. It can be inconvenient, however, to make use of a portable electronic device while the device is plugged in for recharging. In particular, the plug connection or tether prevents portability of the electronic device, and thereby limits ability to use the portable device while it is being charged. In particular the tether limits the range of locations at which the portable device can be used during charging.

SUMMARY

A portable charger tray includes an internal rechargeable power supply and a first wireless power transmitter connected to the internal rechargeable power supply for wirelessly recharging a portable electronic device. A wireless power charging system includes the portable charger tray for wirelessly recharging the portable electronic device and a dock for recharging the internal rechargeable power supply of the portable charger tray.

BRIEF DESCRIPTION OF DRAWINGS

The foregoing summary, as well as the following detailed description of the embodiments, is better understood when read in conjunction with the appended drawings. For the purpose of illustration, various embodiments are shown in the drawings, it being understood, however, that the present disclosure is not limited to the specific embodiments disclosed. In the drawings.

DETAILED DESCRIPTION

Before the various embodiments are described in further detail, it is to be understood that the invention is not limited to the particular embodiments described. It is also to be understood that the terminology used is for the purpose of describing particular embodiments only, and is not intended to limit the scope of the claims of the present application.

Figure 1:
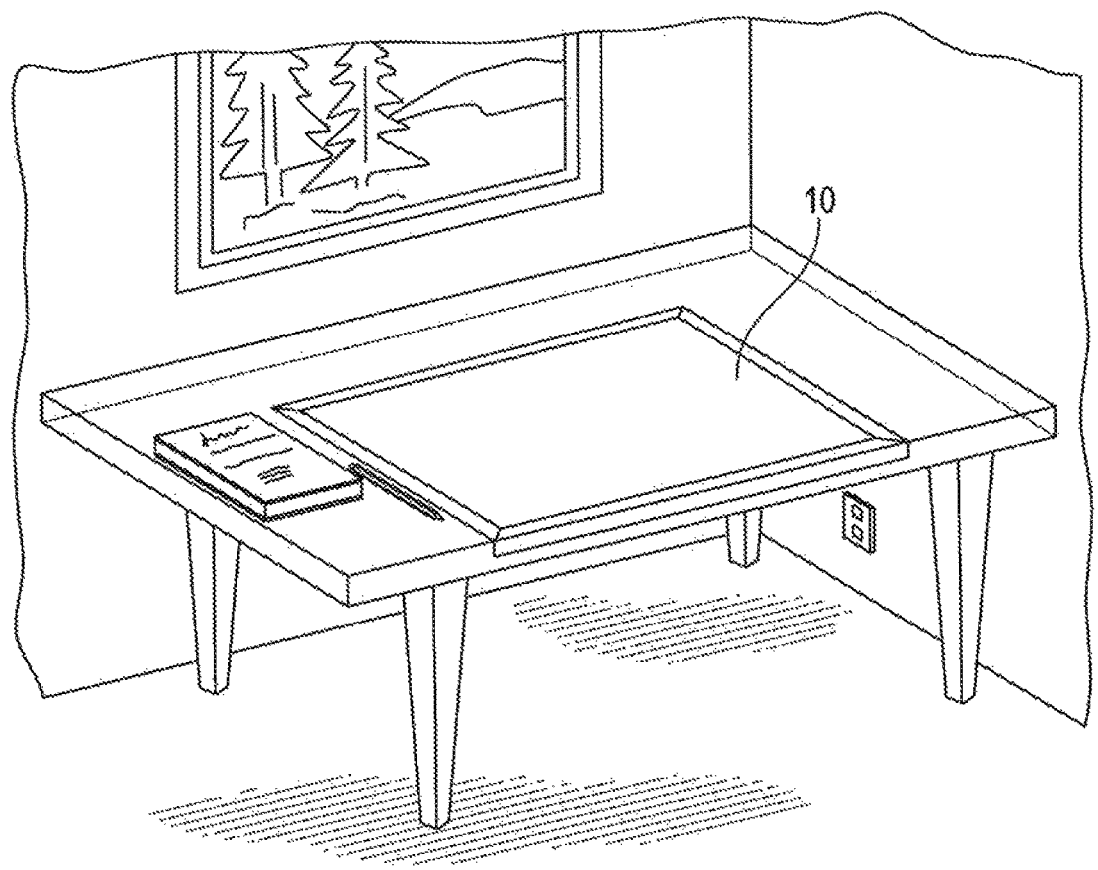
FIG. 1 shows an exemplary portable charger tray.
Figure 2:
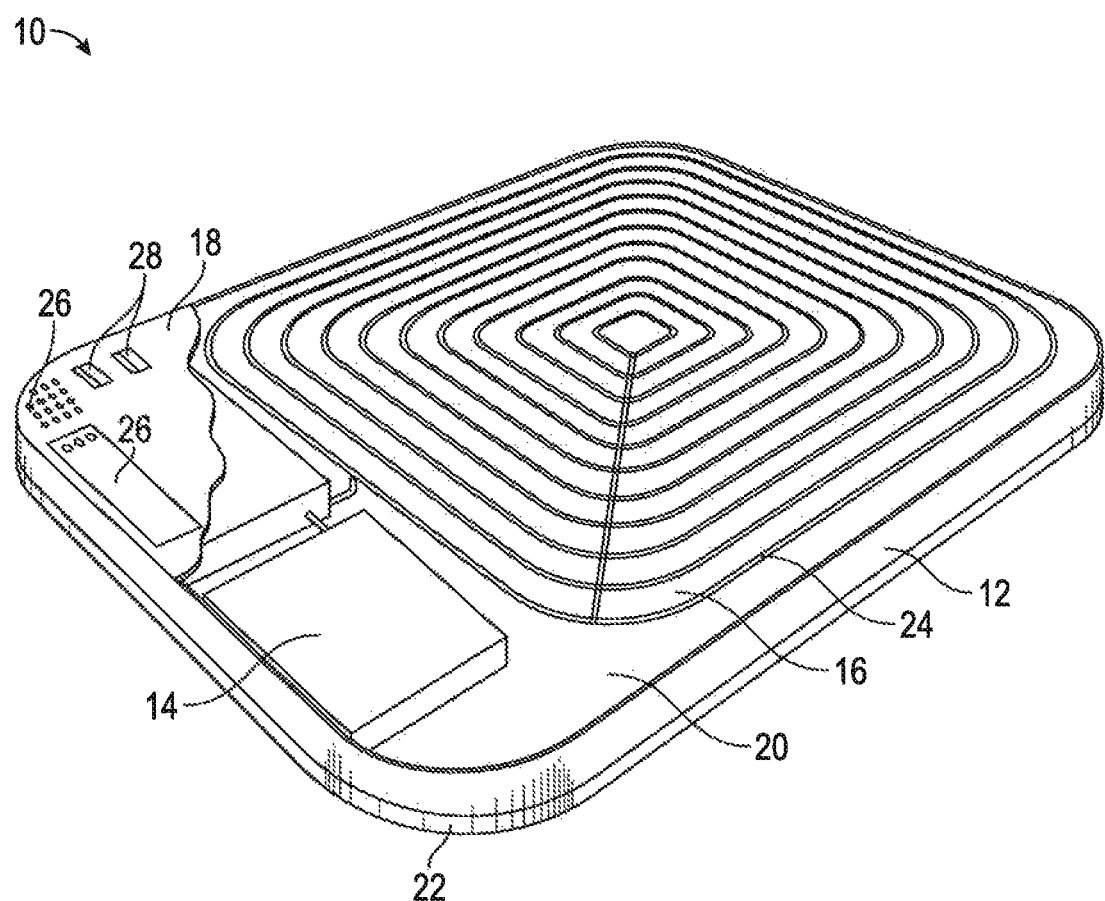
FIG. 2 shows a detailed partial cutaway view of an exemplary portable charger tray.

FIGS. 1 and 2 show a portable charger tray 10 adapted to wirelessly transmit charging power (i.e., current and voltage) to one or more electronic devices, such as e.g., mobile telephones, tablet computers, laptop computers, etc. In one embodiment, as shown in FIG. 2, portable charger tray 10 comprises a case 12 housing an internal rechargeable power supply 14 and a wireless power transmitter 16 connected to the internal rechargeable power supply 14. The Figures of the present application are schematic in nature. The various components may be shown in certain configurations and relative sizes, but it should be understood that the drawings are presented simply for illustrative purposes.

Case 12 of portable charger tray 10 defines a top supporting surface 18 adapted to support one or more electronic devices while charging. For example, top supporting surface 18 may be a planar surface covered with slip-resistant material. Also, case 12 of portable charger tray 10 may be completely sealed with waterproof or weather resistant materials, with no exposed electrical contacts or access to its internal battery, to facilitate outdoor use, make easier to clean and improve safety. Further, a bottom surface 20 of case 12 may include a cushion 22, which may be made of or filled with a soft material, such as a cushion foam, cushion gel, etc., so that portable charger tray 10 may be comfortably set on a person's lap. Case 12 of portable charger tray 10 may also incorporate at least one of a pad, a pen, a cup holder, speakers, a keyboard, or a remote control for a music player, lighting, or a television.

Internal rechargeable power supply 14 is connected to and supplies electrical power to wireless power transmitter 16. Power supply 14 may be any type of rechargeable power supply that can be adapted to provide electrical power to wireless power transmitter 16. For example, power supply 14 may be a battery, super capacitor, small fuel cell, etc. Further, power supply 14 may be a replaceable modular unit that is detachably connected to wireless power transmitter 16 and case 12 of portable charger tray 10. Accordingly, a spent power supply 14 may be easily replaced with a newly charged power supply 14. Additionally, power supply 14 may be designed in various capacities to accommodate various types of needs/uses.

Wireless power transmitter 16 is connected to and receives electrical from power supply 14. Further, wireless power transmitter 16 is configured to wirelessly transmit charging power to one or more electronic devices supported on or in close proximity to top supporting surface 18 of portable charger tray 10. Wireless power transmitter 16 may comprise a transmitting antenna 24 disposed inside case 12 in close proximity to top supporting surface 18. Wireless power transmitter 16 may implement any suitable wireless power standards/technologies for wirelessly transmitting charging power to one or more electronic devices. For example, wireless power transmitter 16 may implement Alliance for Wireless Power's Rezence branded solutions, Wireless Power Consortium's Qi branded inductive solutions, etc. In some embodiments, a shield may be disposed between the wireless power transmitter 16 and power supply 14 to prevent interference with the operation of wireless power transmitter 16.

Also, as shown in FIG. 2, in some embodiments, portable charger tray 10 may also include a status indicator 26 for visually indicating a charge level of internal rechargeable power supply 14, a charging status of internal rechargeable power supply 14 and/or a successful charging link to one or more electronic devices. Visual indicator 26 may include a plurality of discrete LEDs, and/or a display screen (e.g., an LED or LCD display). Status indicator 26 may also include a speaker for providing audible indications associated with a charge level of internal rechargeable power supply 14, a charging status of internal rechargeable power supply 14, a successful charging link to one or more electronic devices and/or impermissible use of portable charger tray 10 (i.e., use of portable charger tray 10 outside a permitted area). Further, as shown in FIG. 2, in some embodiments, portable charger tray 10 may also include one or more power jacks 28 operatively connected to internal rechargeable power supply 24 for supplying power to one or more electronic devices via a cable connection. For example, power jacks 28 may be USB compliant jacks.

Figure 3:
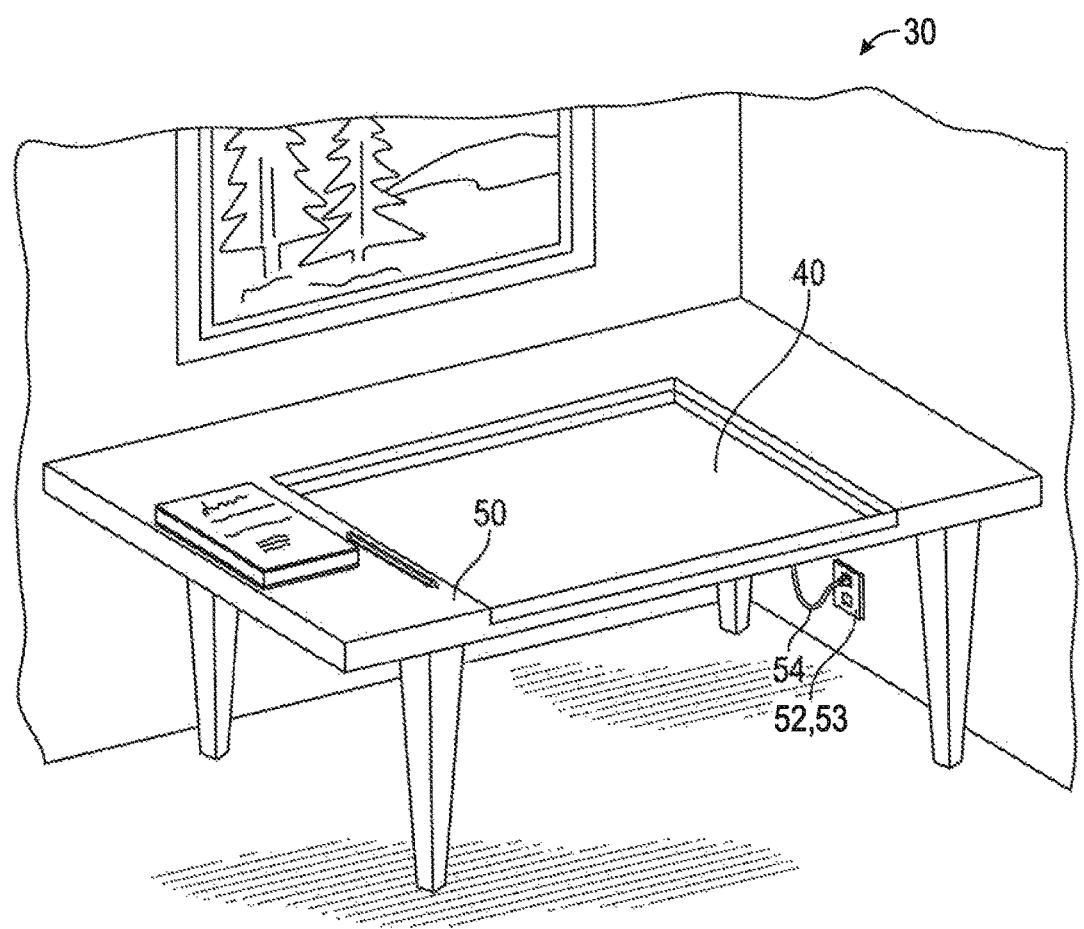
FIG. 3 shows an exemplary wireless power charging system.
Figure 4:
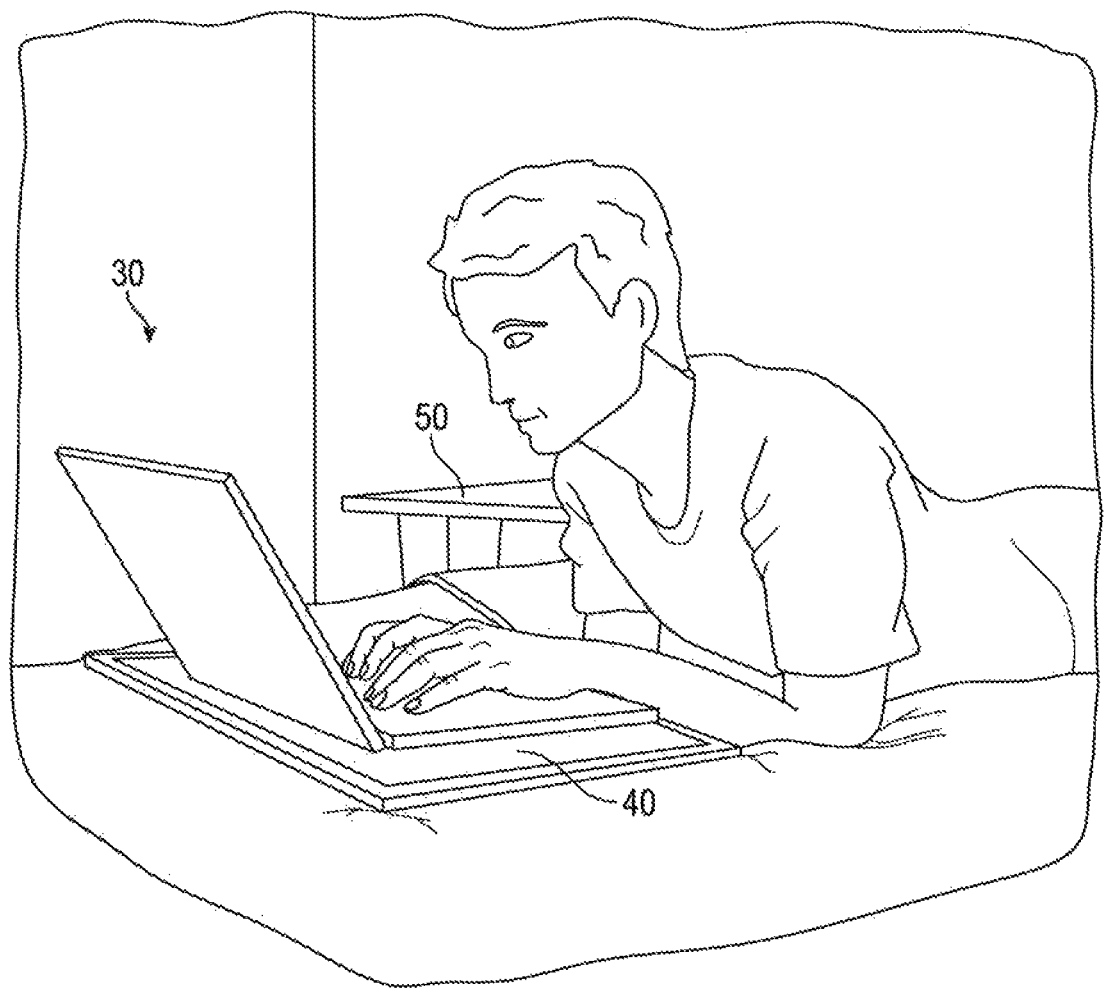
FIG. 4 shows another view of the exemplary wireless power charging system of FIG. 3.

FIGS. 3 and 4 show a wireless power charging system 30 comprising a portable charger tray 40 and a recharging dock 50. Portable charger tray 40 includes all of the same components as portable charger tray 10 described above and additionally includes components for operatively coupling portable charger tray 40 to recharging dock 50. Accordingly, the above description of portable charger tray 10 is equally applicable to portable charger tray 40 and is incorporated by reference. Thus, the components of portable charger tray 40, which are in common with the components of portable charger tray 10, will herein be described by referring to the same names and reference numerals used to describe the components of portable charger tray 10 above.

As shown in FIG. 3, portable charger tray 40 is operatively coupled to recharging dock 50 to recharge internal rechargeable power supply 14 of portable charger tray 40. As shown in FIGS. 6-10, in addition to the components described above in connection with portable charger tray 10, portable charger tray 40 includes a charging receiver 41 connected to internal rechargeable power supply 14. Charging receiver 41 supplies electrical power for charging internal rechargeable power supply 14 of portable charger tray 10. As shown in FIGS. 3, 6, 9 and 10, recharging dock 50 comprises a charging transmitter 51 configured to be connected to a power supply 52. Power supply 52 may be any type of power supply that can supply electrical power to charging transmitter 51. For example, as shown in FIG. 3, power supply 52 may be external to recharging dock 50, such as an in-wall electrical receptacle 53 connected to the primary alternating current (AC) power supply in a building. In such an embodiment as shown in FIG. 3, recharging dock 50 may comprise a conventional plug and cord 54, which may be connected to in-wall electrical receptacle 53 to provide 120 V AC to charging transmitter 51. Alternatively, power supply 52 may be a built-in power supply, such as a battery, super capacitor, small fuel cell, etc., which may be incorporated into recharging dock 50. Further, power supply 52 may be a replaceable modular unit that is detachably connected to charging transmitter 51 and recharging dock 50.

Figure 6:
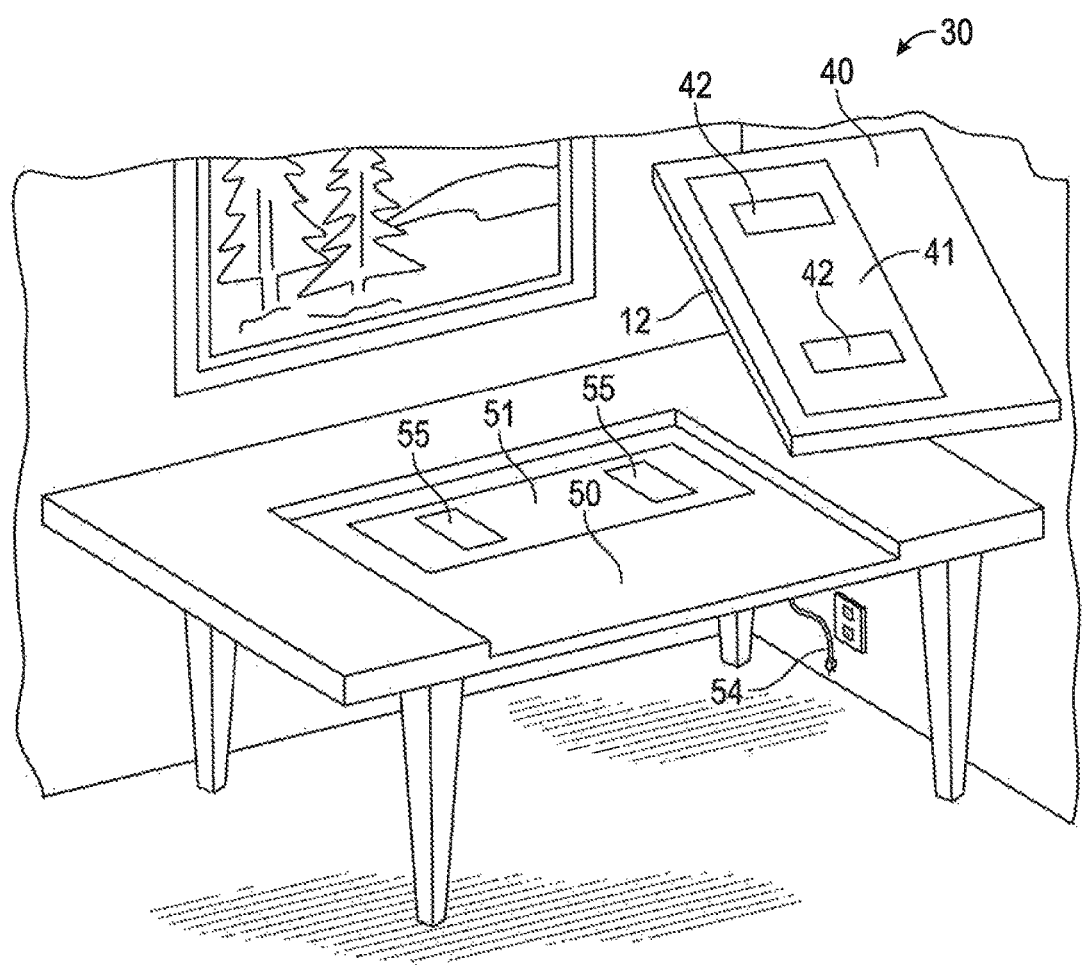
FIG. 6 shows another exemplary wireless power charging system.
Figure 7:
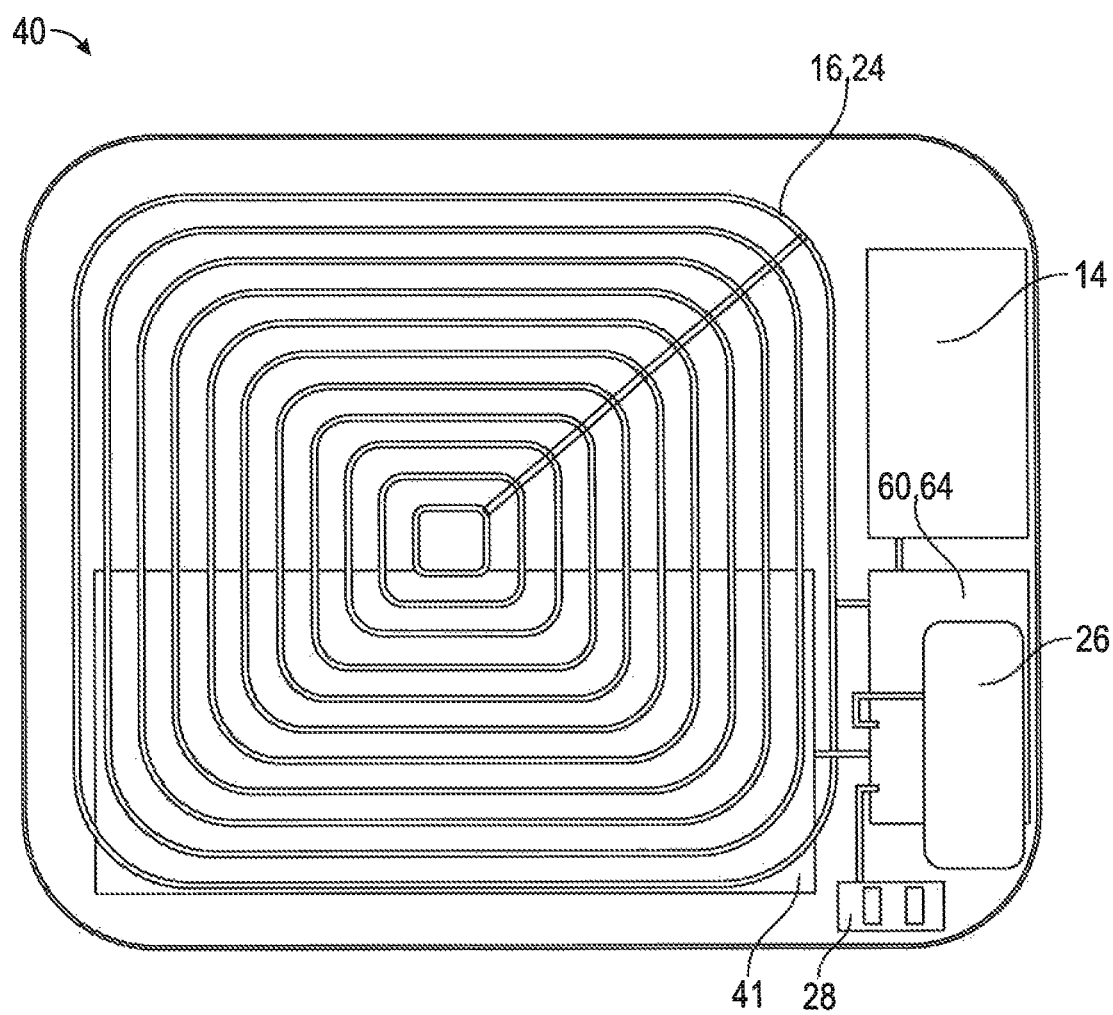
FIG. 7 shows a top view of the interior of an exemplary portable charger tray of the power charging system of FIG. 6.
Figure 8:
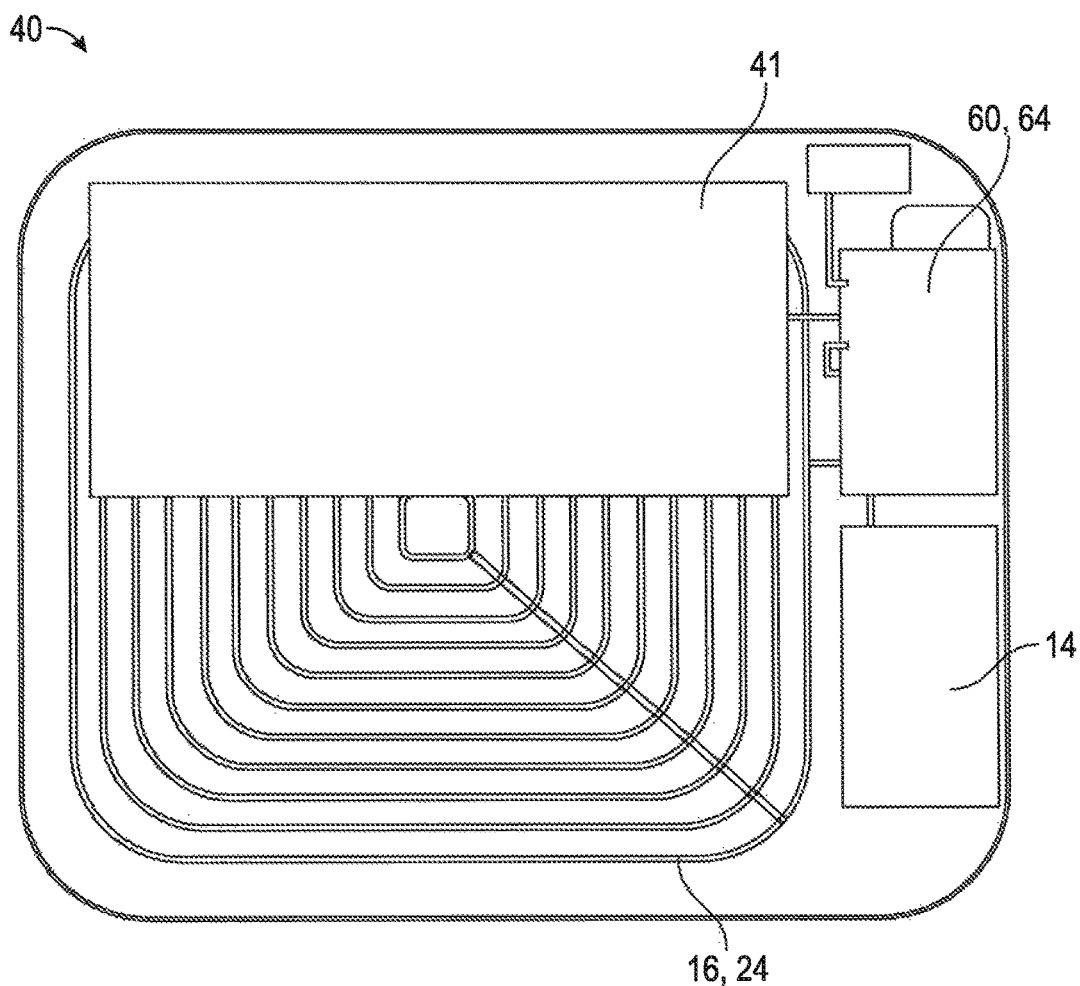
FIG. 8 shows a bottom view of the interior of the portable charger tray of FIG. 7.
Figure 9:
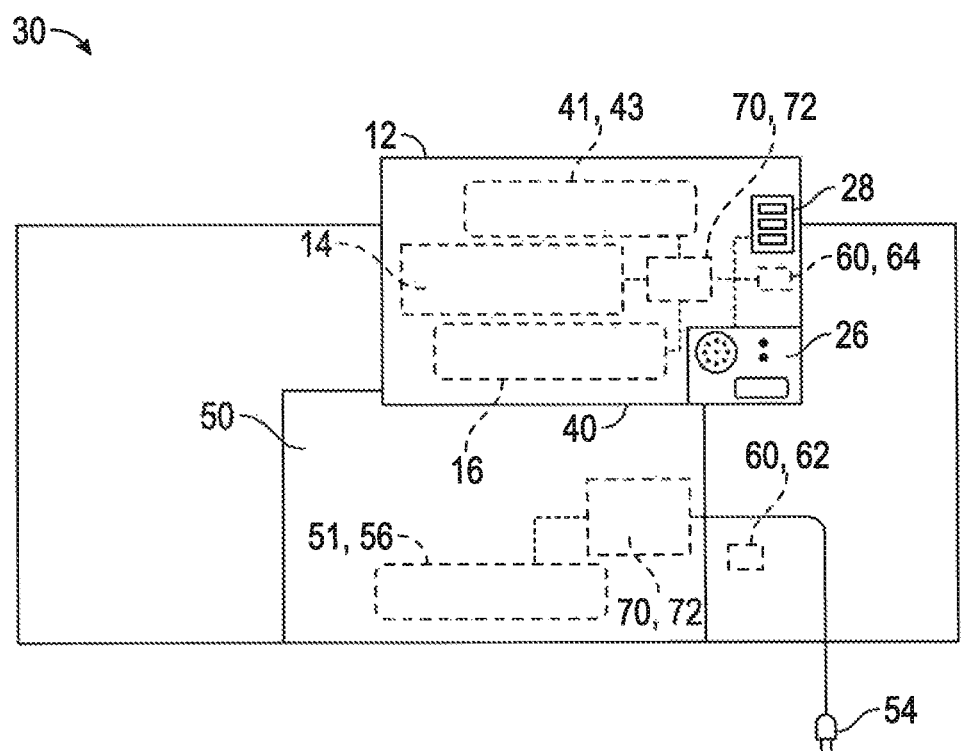
FIG. 9 shows another exemplary wireless power charging system.
Figure 10:
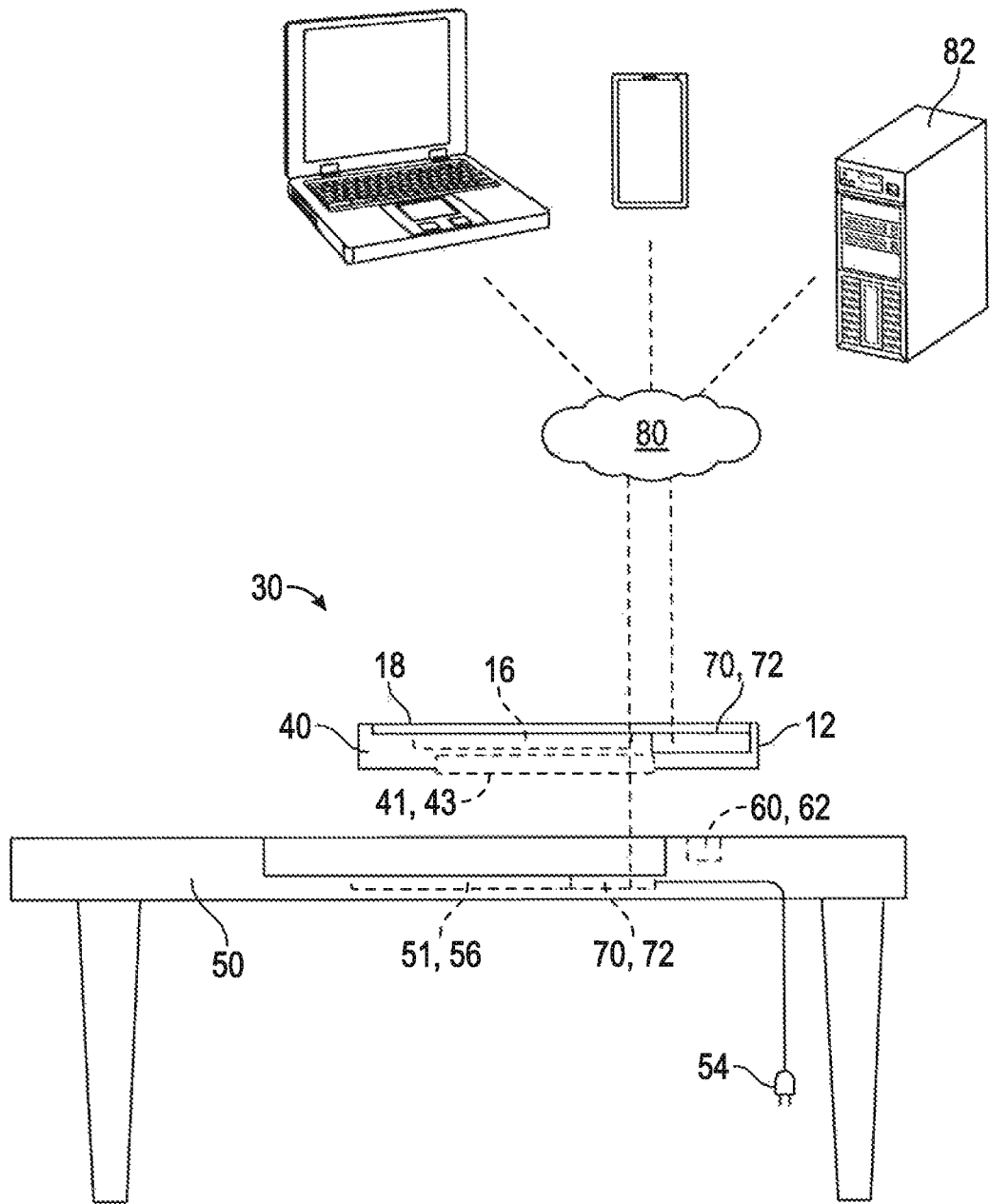
FIG. 10 shows another view of the exemplary wireless power charging system of FIG. 9.

As shown in FIGS. 6, 9 and 10, charging receiver 41 of portable charger tray 40 and charging transmitter 51 of recharging dock 50 are adapted to be operatively connected to transmit charging power from recharging dock 50 to portable charger tray 40 for recharging internal rechargeable power supply 14 of portable charger tray 40. In one embodiment, as shown in FIGS. 6-8, conductive contacts 42 of charging receiver 41 of portable charger tray 40 are adapted to contact or mate with conductive contacts 55 of charging transmitter 51 of recharging dock 50 to transmit charging power from recharging dock 50 to portable charger tray 40. Alternatively, charging receiver 41 of portable charger tray 40 may comprise one of an electrical plug or socket connector and charging transmitter 51 of recharging dock 50 may comprise the other of a mating electrical plug or socket connector, which may be mated to transmit charging power from recharging dock 50 to portable charger tray 40.

In another embodiment, as shown in FIGS. 9-12, charging receiver 41 of portable charger tray 40 and charging transmitter 51 of recharging dock 50 may be operatively connected to wirelessly transmit charging power from recharging dock 50 to portable charger tray 40 for recharging internal rechargeable power supply 14 of portable charger tray 40. In such an embodiment as shown in FIGS. 9-10, charging receiver 41 of portable charger tray 40 includes a wireless power receiver 43 and charging transmitter 51 of recharging dock 50 includes a wireless power transmitter 56, which are adapted to wirelessly transmit charging power from recharging dock 50 to portable charger tray 40 for recharging internal rechargeable power supply 14 of portable charger tray 40. In some embodiments, a shield may be disposed between wireless power receiver 43 and power supply 14 to prevent interference with the operation of wireless power receiver 43. Wireless power transmitter 56 and wireless power receiver 43 may implement any suitable wireless power standards/technologies for wirelessly transmitting charging power from recharging dock 50 to portable charger tray 40. For example, wireless power transmitter 56 may implement Alliance for Wireless Power's Rezence branded solutions, Wireless Power Consortium's Qi branded inductive solutions, etc.

Figure 5:
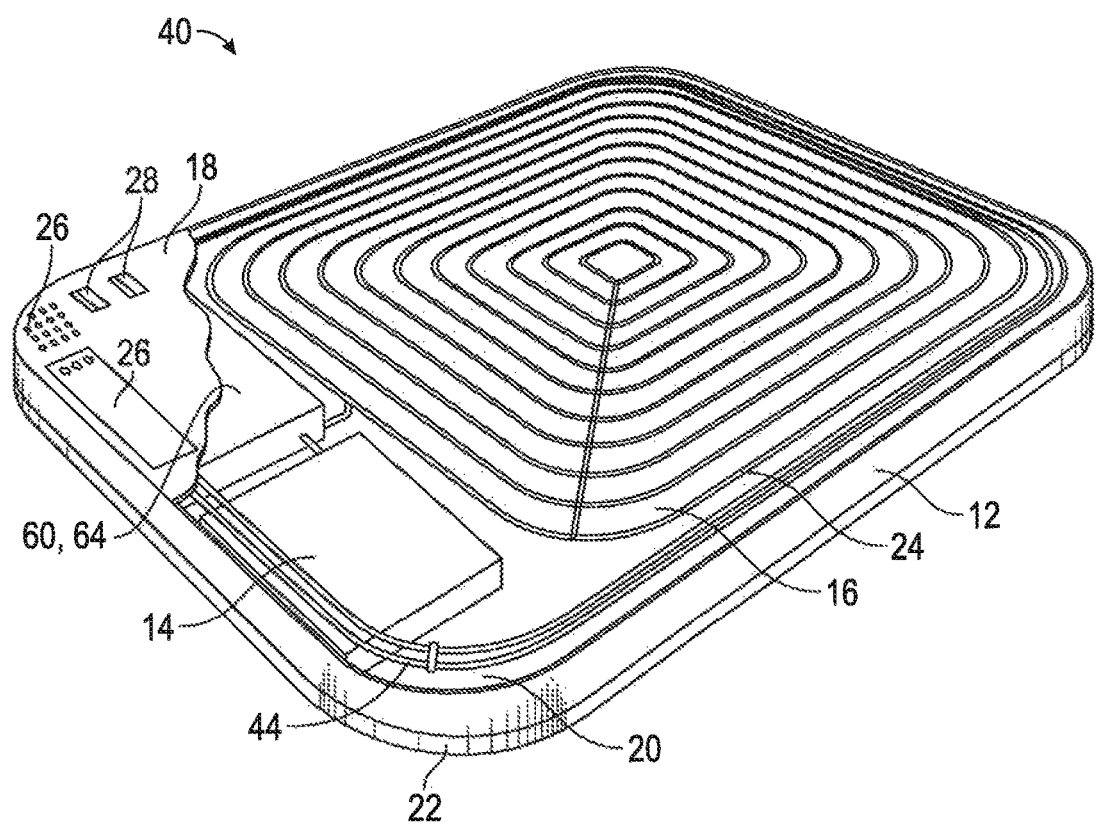
FIG. 5 shows a detailed partial cutaway view of an exemplary portable charger tray of the wireless power charging system of FIG. 3.
Figure 11:
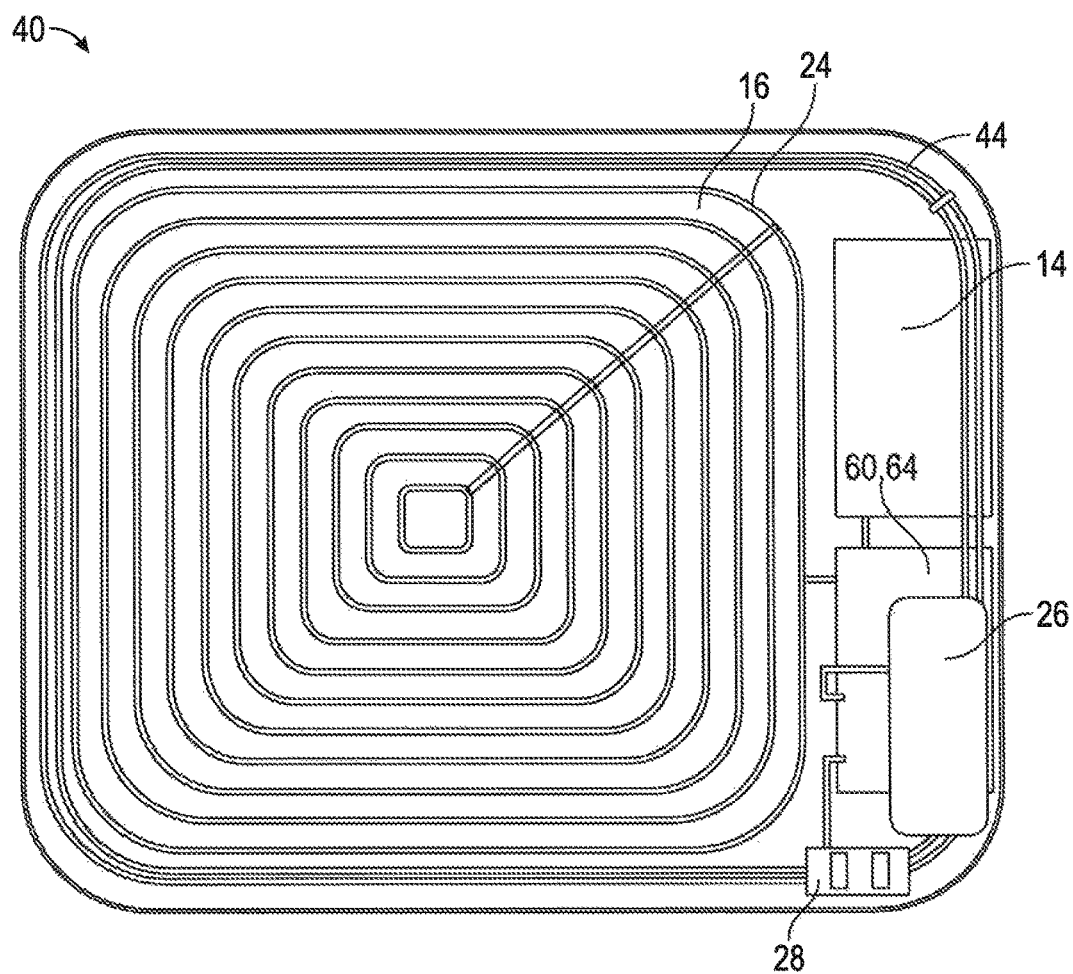
FIG. 11 shows a top view of the interior of an exemplary portable charger tray of the power charging system of FIG. 9.
Figure 12:
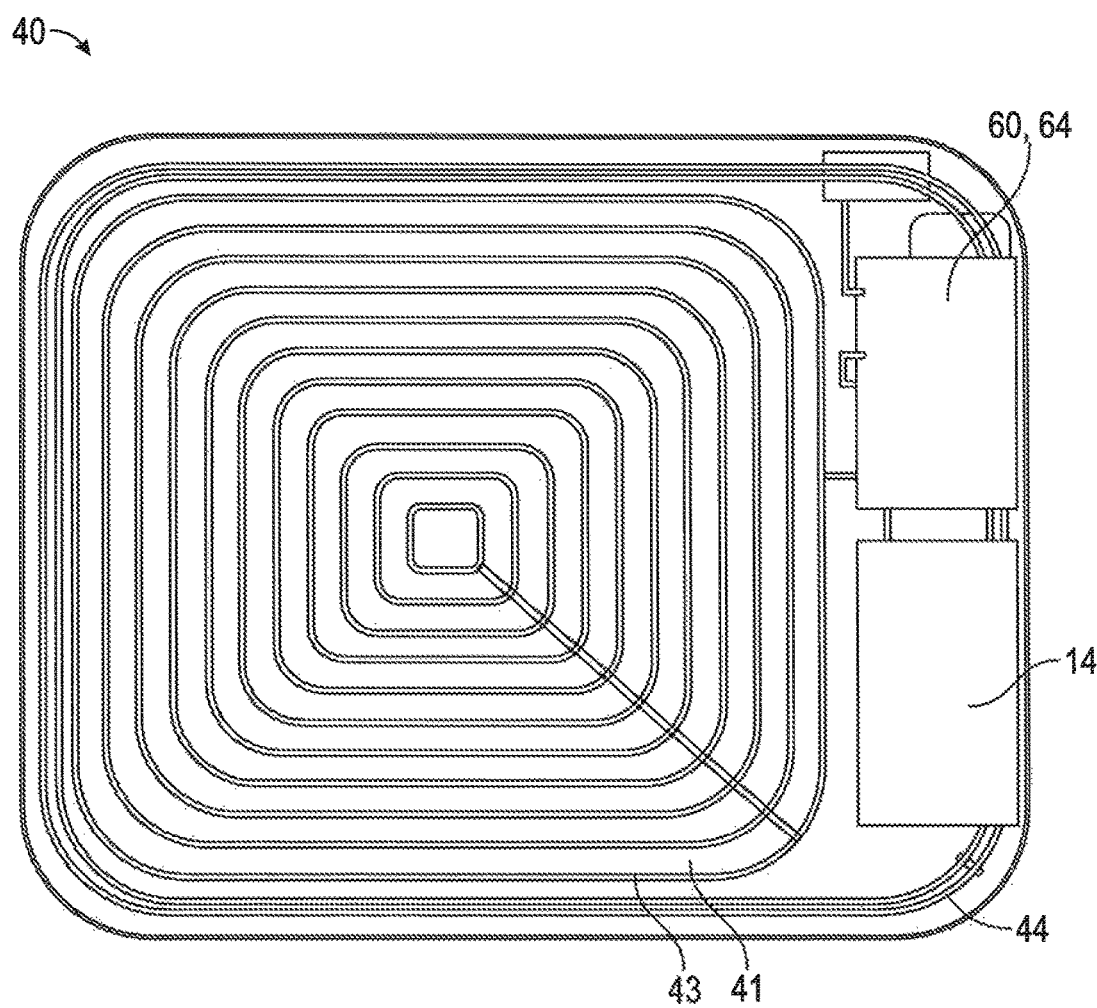
FIG. 12 shows a bottom view of the interior of the portable charger tray of FIG. 11.

In some embodiments, as shown in FIGS. 5 and 11-12, portable charger tray 40 may further include a coil 44 housed in case 12, which acts as a passive resonant repeater to transfer power from a transmitting antenna of wireless power transmitter 56 of recharging dock 50 to a receiving antenna of one or more electronic devices. Accordingly, when portable charger tray 40 is operatively coupled to recharging dock 50, charging receiver 41 and wireless power transmitter 16 of portable charger tray 40 act as a passive resonant repeater to transfer power from a transmitting antenna of wireless power transmitter 56 of recharging dock 50 to a receiving antenna of one or more electronic devices, while also charging internal rechargeable power supply 14. Thereby, coil 44 allows portable charger tray 40 to simultaneously charge its own internal rechargeable power supply 14 and also charge one or more electronic devices supported on or in close proximity to top supporting surface 18 of portable charger tray 40.

Additionally, in some embodiments, as shown in FIGS. 5 and 7-12, wireless portable charger system 30 may further comprise control means 60 for determining whether portable charger tray 40 is within a designated operational distance from recharging dock 50. Further, control means 60 may be configured to disable portable charger tray 40 when portable charger tray 40 is beyond a designated operational distance from recharging dock 50. In one embodiment, control means 60 may comprise a first controller 62 associated with recharging dock 50 in communication with a second controller 64 housed in case 12 of portable charger tray 40. First controller 62 and second controller 64 can be, for example, microprocessors. Either first controller 62 associated with recharging dock 50 or second controller 64 in portable charger tray 40 can be configured to determine a distance between portable charger tray 40 and recharging dock 50, such as by receiving and processing signals from appropriate sensors, which may be integrated into or separate from the controller. Additionally, one of the controllers 62, 64 can be configured to determine whether portable charger tray 40 is beyond a designated operational distance from recharging dock 50. Further, controller 64 in portable charger tray 40 may be connected to wireless power transmitter 16 of portable charger tray 40, and may be configured to disable wireless power transmitter 16 when portable charger tray 40 beyond a designated operational distance from recharging dock 50. Thus, controller 64 may prevent charging of electronic devices by portable charger tray 40 if portable charger tray 40 is outside a permissible use area. Additionally, controller 64 may be connected to status indicator 26 of portable charger tray 40 for indicating whether portable charger tray 40 is within or beyond a designated operational distance from recharging dock 50.

Furthermore, in some embodiments, as shown in FIGS. 9-10, wireless portable charger system 30 may further comprise a communication module 70 in communication with a system network 80. Communication module 70 may be implemented on one or more microprocessors 72 and may communicate with system network 80 via any suitable communication protocol, including but not limited to: Ethernet, Wi-Fi, BLUETOOTH®, GSM and TCP/IP. Communication module 70 may be associated with portable charger tray 10, 40 and/or recharging dock 50 and adapted to communicate to system network 80 the status of recharging dock 50 and/or portable charger tray 10, 40, including but not limited to information processed by status indicator 26 (e.g., charge level of power supply 14 and 52, charging status of power supply 14 and 52, malfunction of portable charger tray 10, 40 or recharging dock 50, whether portable charger tray 40 is within a designated operational distance from recharging dock 50).

Additionally, as shown in FIG. 10, communication module 70 may also be adapted communicate with electronic devices via a software application executing on the electronic devices. Accordingly, communication module 70 may communicate information between electronic devices and system network 80. For example, communication module 70 may communicate between electronic devices and system network 80 information such as, for example, device/user authentication information for use of charging service, payment information for use of charging service, location information of device/user, promotional information regarding products/services (e.g., hotel promotions).

As shown in FIG. 10, system network 80 may include a central management server 82 for receiving and processing information received from a plurality of portable charger trays 10, 40, recharging docks 50 and electronic devices. Central management server 82 allows for central monitoring of the status of a plurality of portable charger trays 10, 40 and recharging docks 50, which is advantageous in the context of a large deployment of portable charger trays 10, 40 and recharging docks 50, such as in a hotel setting.

As shown in the Figures, portable charger tray 40 and recharging dock 50 are configured to be operatively connected to transmit charging power from recharging dock 50 to portable charger tray 40. To that end, portable charger tray 40 and recharging dock 50 may be sized and shaped to complement each other and facilitate their operative connection. In one embodiment, recharging dock 50 may be a portable device. In another embodiment, recharging dock 50 may be incorporated into a work surface, such as, for example, a desk, a table, a nightstand, a bureau, a bookshelf, etc. Alternatively, Recharging dock 50 may be incorporated into a structural feature of a room, such as, for example, a wall, built-in shelf, etc. Recharging dock 50 may comprise a receptacle for receiving portable charger tray 40, so that portable charger tray 40 may be securely nested in recharging dock 50. In one embodiment, portable charger tray 40 may have the shape of a flat tray configured to fit in a receptacle of recharging dock 50 so that top supporting surface 18 of portable charger tray 40 is flush with a work surface of recharging dock 50. This permits use of portable charger tray 40 as part of a work surface of recharging dock 50. Portable charger tray 40 may be sized and shaped to accommodate various uses. For example, portable charger tray 40 may be sized to accommodate a single electronic device or multiple electronic devices for charging simultaneously.

Additionally, each of portable charger tray 40 and recharging dock 50 may include complementary surfaces for facilitating their operative connection. For instance, the complementary surfaces of portable charger tray 40 and recharging dock 50 may include conductive contacts 42 and 55, or wireless power receiver 43 and wireless power transmitter 56, respectively, so that they can be coupled to transmit charging power from recharging dock 50 to portable charger tray 40. Preferably, the complementary surfaces of portable charger tray 40 and recharging dock 50 are standardized so that any of a plurality of portable charger trays 40 can be used in conjunction with any of a plurality of recharging docks 50.

In use, as shown in FIGS. 3-4, portable charger tray 40 can be detached from recharging dock 50 and can be used to recharge or otherwise sustain operation of one or more portable electronic devices remotely from recharging dock 50 but still within a designated operational distance from recharging dock 50. In the event that portable charger tray 40 requires recharge of its internal rechargeable power supply 14, portable charger tray 40 may be returned to and operatively connected to recharging dock 50—as shown in FIG. 3—to recharge internal rechargeable power supply 14. Alternatively, in the event that portable charger trays 10, 40 require recharge of its internal rechargeable power supplies 14, the spent power supplies 14 may be replaced with charged power supplies 14. Such a use would allow for power supplies 14 to be charged at one central location or a few locations and to then be distributed for use.

As is evident from the above description of various embodiments, portable charger tray 40 and recharging dock 50 may be optimized for the users' convenience in the context of the setting in which portable charger trays 10, 40 and recharging dock 50 are to be used. While implementation of portable charger trays 10, 40 and recharging dock 50 may have been described in the context of a hotel setting, it should be recognized that portable charger trays 10, 40 and recharging dock 50 may be easily adapted for use in other settings, such as, for example, homes, dormitories, public lounges/bar/restaurants, waiting areas, offices, etc.

Although portable charger tray 10 has been described as being used to charge the power supplies (e.g., rechargeable batteries) of electronic devices (e.g., mobile telephones, tablet computers, laptop computers), it should be understood that portable charger tray 10 may also be used to directly power electronic devices using the same wireless power transmission generated by wireless power transmitter 16.

While various embodiments have been described, it will be appreciated by those of ordinary skill in the art that modifications can be made to the various embodiments without departing from the spirit and scope of the invention as a whole.

What is claimed is:

1. A wireless power charging system, comprising:
   a table with a tabletop;
   a recharging dock integrated into the table top, the recharging dock including a charging transmitter connected to a power cord adapted to be connected to a power supply;
   a portable charger tray including:
      an internal rechargeable power supply;
      a wireless power transmitter connected to the internal rechargeable power supply, the wireless power transmitter comprising a transmitting antenna;
      a charging receiver connected to the internal rechargeable power supply;
      a coil acting as a passive resonant repeater; and
      a case housing the internal rechargeable power supply, the wireless power transmitter, the charging receiver and the coil;
   wherein the transmitting antenna of the wireless power transmitter of the portable tray wirelessly transmits a first charging power from the internal rechargeable power supply of the portable tray to a receiving antenna of one or more electronic devices;
   wherein the charging receiver of the portable tray is operatively connected to the charging transmitter of the recharging dock to transmit a second charging power for recharging the internal rechargeable power supply of the portable tray; and
   wherein the coil of the portable tray transfers a third charging power from the charging transmitter of the recharging dock to the receiving antenna of the one or more electronic devices.

2. The portable charger tray of claim 1, wherein the internal rechargeable power supply is a battery, super capacitor or small fuel cell.

3. The portable charger tray of claim 1, wherein the internal rechargeable power supply is a modular unit detachably connected to the wireless power transmitter and removable from the case of the portable charger tray.

4. The portable charger tray of claim 1, further comprising a visual indicator for indicating a charge level of the internal rechargeable power supply, a charging status of the internal rechargeable power supply and/or a successful charging link to the one or more electronic devices.

5. The portable charger tray of claim 1, further comprising at least one power jack operatively connected to the internal rechargeable power supply for supplying power.

6. The portable charger tray of claim 5, wherein the at least one power jack is a USB socket.

7. The portable charger tray of claim 1, wherein the case of the portable charger tray is sealed with waterproof or weather resistant materials.

8. A wireless power charging system, comprising:
   a table with a tabletop;
   a recharging dock integrated into the table top, the recharging dock including a charging transmitter configured to be connected to a power supply, the charging transmitter comprising a second transmitting antenna;
   a portable charger tray including:
      an internal rechargeable power supply;
      a first wireless power transmitter connected to the internal rechargeable power supply, the first wireless power transmitter comprising a first transmitting antenna;
      a charging receiver connected to the internal rechargeable power supply, the charging receiver comprising a wireless power receiver;
      a coil acting as a passive resonant repeater; and
      a case housing the internal rechargeable power supply, the first wireless power transmitter, the charging receiver and the coil;
   wherein the first transmitting antenna of the first wireless power transmitter wirelessly of the portable tray transmits a first charging power from the internal rechargeable power supply of the portable tray to a receiving antenna of one or more electronic devices; and
   wherein the second transmitting antenna of the charging transmitter of the recharging dock wirelessly connects to the wireless power receiver of the charging receiver of the portable charger tray to transmit a second charging power for recharging the internal rechargeable power supply of the portable charger tray;
   wherein the coil of the portable charger tray transfers a third charging power from the second transmitting antenna of the charging transmitter of the recharging dock connected to the power supply to the receiving antenna of the one or more electronic devices.

9. The wireless power charging system of claim 8, wherein the internal rechargeable power supply is a battery, super capacitor or small fuel cell.

10. The wireless power charging system of claim 8, wherein the internal rechargeable power supply is a modular unit detachably connected to the first wireless power transmitter and removable from the case of the portable charger tray.

11. The wireless portable charger system of claim 8, further comprising control means for determining whether the portable charger tray is within a designated operational distance from the recharging dock; wherein the control means comprises at least one controller.

12. The wireless portable charger system of claim 11, wherein the control means disables the portable charger tray when the portable charger tray is beyond the designated operational distance from the recharging dock.

13. The wireless portable charger system of claim 8, wherein the portable charger tray further includes a visual indicator for indicating a charge level of the internal rechargeable power supply, a charging status of the internal rechargeable power supply and/or a successful charging link to the one or more electronic devices.

14. The wireless portable charger system of claim 8, wherein the portable charger tray further includes one or more power jacks operatively connected to the internal rechargeable power supply for supplying power.

15. A wireless power charging system, comprising:
a table with a tabletop;
a recharging dock integrated into the table top, the recharging dock including a charging transmitter connected to a power cord adapted to be connected to a power supply; and
a portable charger tray including an internal rechargeable power supply, a first wireless power transmitter connected to the internal rechargeable power supply, a charging receiver connected to the internal rechargeable power supply, and a case housing the internal rechargeable power supply, the first wireless power transmitter and the charging receiver;
wherein the first wireless power transmitter is configured to wirelessly transmit a first charging power to one or more electronic devices; and
wherein the charging transmitter of the recharging dock is operatively connected to the charging receiver of the portable charger tray to transmit a second charging power for recharging the internal rechargeable power supply of the portable charger tray; and
wherein the portable charger tray is nested in a recessed receptacle of the recharging dock to receive the second charging power.

16. The wireless power charging system of claim 15,
wherein the charging receiver of the portable charger tray includes a wireless power receiver;
wherein the charging transmitter of the recharging dock includes a second wireless power transmitter; and
wherein the second wireless power transmitter of the charging transmitter wirelessly connects with the wireless power receiver of the charging receiver to transmit the second charging power for recharging the internal rechargeable power supply of the portable charger tray.

17. The wireless power charging system of claim 15,
wherein the charging receiver of the portable charger tray includes first conductive contacts;
wherein the charging transmitter of the recharging dock includes second conductive contacts; and
wherein the first conductive contacts of the charging receiver contact the second conductive contacts of the charging transmitter to transmit the second charging power for recharging the internal rechargeable power supply of the portable charger tray.

* * * * *